(12) United States Patent
Rosenblatt et al.

(10) Patent No.: US 6,537,821 B1
(45) Date of Patent: Mar. 25, 2003

(54) METHOD AND APPARATUS FOR DETECTING, MEASURING, AND/OR REMOVING CHLORINE GAS CONTAMINATION IN GASEOUS CHLORINE DIOXIDE

(75) Inventors: Aaron A. Rosenblatt, New York, NY (US); Thomas E. McWhorter, Allentown, PA (US); David Rosenblatt, Baltimore, MD (US); Dale A. Genther, Allentown, PA (US); Mark Massar, Bethelem, PA (US); Katarina Georgiev, Easton, PA (US)

(73) Assignee: CDG Technology Inc., Lehigh Valley, PA (US)

( * ) Notice: Subject to any disclaimer, the term of this patent is extended or adjusted under 35 U.S.C. 154(b) by 177 days.

(21) Appl. No.: 09/590,249

(22) Filed: Jun. 8, 2000

(51) Int. Cl.[7] .............................. G01N 33/00
(52) U.S. Cl. ................. 436/124; 436/111; 422/55; 422/58; 422/82.05
(58) Field of Search ............... 436/111, 124, 436/125; 422/37, 55, 58, 82.05

(56) References Cited

U.S. PATENT DOCUMENTS 3,502,436 A    3/1970  Hoover et al.
4,175,865 A  * 11/1979  Horvath et al. ............. 356/338

FOREIGN PATENT DOCUMENTS

WO    WO 91/04091    4/1991

OTHER PUBLICATIONS

Belousova, E. V., "IR spectra and calculation of vibrations of complexes of ammonia with chlorine and bromine", Fiz.–Khim. Protsessy Gazov. Kondens. Fazakh (1979), 101. Editor(s): Kondrat'ev, V. N. Akad. Nauk SSSR, Inst. Khim. Fiz.: Chernogolovka, USSR.*

Belousova et al. "Infrared spectra of complexes of ammonia with chlorine and bromine", Zh. Fiz. Khim. (1975), 49(4), 1075–6 (Abstract).*

* cited by examiner

*Primary Examiner*—Jill Warden
*Assistant Examiner*—Yelena Gakh
(74) *Attorney, Agent, or Firm*—Ratner Prestia

(57) ABSTRACT

Method and apparatus for detecting the presence of or removing chlorine in a gaseous product stream from a chlorine dioxide generator by mixing gaseous ammonia or ammonia vapors with the product stream and either observing smoke generated by the reaction of ammonia with any chlorine present in the chlorine dioxide product stream or separating reaction products from the chlorine dioxide.

8 Claims, 4 Drawing Sheets

METHOD AND APPARATUS FOR DETECTING, MEASURING, AND/OR REMOVING CHLORINE GAS CONTAMINATION IN GASEOUS CHLORINE DIOXIDE

BACKGROUND OF THE INVENTION

The present invention pertains to the production of chlorine dioxide gas and in particular the detection of chlorine gas in the chlorine dioxide gas product.

Chlorine dioxide is known to be a useful gas for controlling microbial contamination of a myriad of products, most importantly for disinfecting drinking water. In the treatment of water with chlorine dioxide for drinking and other uses, it is beneficial to have pure chlorine dioxide that is substantially free of molecular chlorine. Molecular chlorine can react with organic compounds in the water to produce undesirable toxic chlorinated by-products, such as trihalomethanes (THM's), whereas pure chlorine dioxide does not react with the organic species to produce, to any significant degree, these undesirable chlorinated disinfection by-products (DBP's).

Chlorine dioxide is also used for bleaching paper pulp. The presence of molecular chlorine in the chlorine dioxide gas can react with lignin to produce undesirable environmental pollutants, such as dioxins. Pure chlorine dioxide does not produce dioxins.

Another use for chlorine dioxide is in the sterilization of medical products. Use of chlorine dioxide for such applications is described in U.S. Pat. Nos. 4,504,422, 4,681,739 and 4,908,188. The materials from which certain medical devices are constructed are functionally unaffected by chlorine dioxide, but are incompatable with molecular chlorine. If molecular chlorine is present in the chlorine dioxide gas, some of the products being sterilized may be spoiled or rendered unsafe for use. Because chlorine dioxide has a unique chemistry it is compatible with many products that are used in health care.

For some applications of chlorine dioxide, small amounts of chlorine can be tolerated without rendering the chlorine dioxide unsuitable for the particular application.

Because chlorine dioxide can not be shipped or stored as a compressed gas it is almost always generated at the point of use. On site production of chlorine dioxide can be achieved through several processes. For example, sodium chlorate ($NaClO_3$) can be used as the starting material and reacted with HCl according to the following reaction:

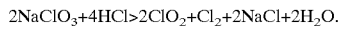

Sodium chlorite ($NaClO_2$) can be used as a starting material, which is reacted with chlorine gas according to the following equation to form gaseous chlorine dioxide.

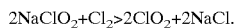

Because chlorine is often an undesirable contaminant in chlorine dioxide, as set forth above, it is desirable to detect and measure the concentration of chlorine in the chlorine dioxide product. Because the amount of chlorine in the chlorine dioxide produced by some methods is a function of the operating parameters employed, (e.g. concentration, time, temperature, pressure), measurement of chlorine levels in the chlorine dioxide will be useful in helping to alert the operator of the generating process when chlorine in the chlorine dioxide exceeds an acceptable level.

U.S. Pat. Nos. 5,110,580, 5,234,678, 5,290,524 and 5,326,546 all describe gas-solid methods for producing chlorine dioxide gas. The principal chemical reaction utilized in these processes is that defined by the reaction of dry sodium chlorite and chlorine gas as the starting materials, the second equation noted above.

Chlorine gas, upon contact with solid sodium chlorite in a reaction cartridge, is replaced by chlorine dioxide. As the sodium chlorite is used up, the reaction front moves forward. A low, but increasing, concentration of unreacted gaseous chlorine in a high concentration of chlorine dioxide ($ClO_2$), along with inert gaseous carrier, eventually reaches the outlet of the reaction cartridge. The level of emergent chlorine initially detectable at the outlet is called the "breakthrough concentration". Breakthrough detection at an appropriate level signals the need to switch the chlorine-bearing input gas stream to a fresh, unreacted, sodium chlorite cartridge.

Prior to the present invention, there appears to have been no simple, effective method for detecting low breakthrough concentrations of chlorine (e.g. 500 ppm of chlorine) in the presence of, for example, 40,000 ppm of chlorine dioxide. Methods based upon inexpensive forms of mass spectrometery, for instance, would be adversely affected by the proximity and breadth of the peaks representing chlorine and chlorine dioxide. Similarly, the two molecules have overlapping ultraviolet absorbence spectra. Therefore, ultraviolet (UV) spectrophotometry is not a practical analytical technique. This is especially true when the concentration of chlorine dioxide is high relative to the concentration of chlorine. There are various methods for dissolving the gas mixture in water and measuring the concentrations in the liquid. These, under certain circumstances, may be useful for detecting the presence of chlorine, but quantitative measurements are limited in accuracy because of the imprecision of the dissolution processes. Also, solution-based processes involve multiple steps and are often difficult to automate. Therefore, there is a need to find a method for detecting and measuring chlorine gas contamination of gaseous chlorine dioxide at various levels of chlorine gas contamination.

SUMMARY OF THE INVENTION

The present invention utilizes the discovery that in the gas phase, chlorine reacts with ammonia, while chlorine dioxide does not so react. The reaction of molecular chlorine gas with ammonia in the gas phase produces a white smoke, which is believed to be ammonium chloride particles. It is further believed that the overall reaction proceeds according to the following:

Mixing an excess quantity of ammonia with a sample gas suspected to contain chlorine results in the density of the smoke increasing with the concentration of the chlorine gas present in the sample. According to one embodiment of the present invention the smoke can be detected by optical means, such as light absorbence, light scatter or light transmission. When a beam of light shines through a cell containing a sample of chlorine gas in chlorine dioxide gas with air and ammonia, the amount of transmitted light decreases with the amount of chlorine in the sample. According to a preferred embodiment of the present invention an effective method of detecting the presence of smoke produced by the reaction of ammonia and chlorine utilizes radiation in the red to infrared region of the spectrum (greater than 630 nanometer wavelength). It is believed that light of any wavelength that is not absorbed by chlorine, ammonia, or chlorine dioxide can be used. Other parts of the spectrum, e.g. yellow light may work.

According to the present invention, a sample of chlorine dioxide can be introduced into a transparent cell having means to emit and detect radiation of a certain frequency passed through this sample. The sample is premixed with an excess amount of ammonia so that any chlorine present in the sample will react with the ammonia to produce smoke. The smoke is then detected by a change in the light transmittance through the cell. The amount of decrease in transmittance is directly related to the quantity of chlorine present in the sample.

According to the present invention, depending upon the cycle requirements, sampling can take place periodically with the sample being drawn from the outlet of a chlorine dioxide generator. Auxiliary equipment can be used to clean the cell to avoid contaminants after each sample is removed from the cell, immediately before a new sample is introduced to the cell, or after $Cl_2$ is detected, given that the chlorine and ammonia reaction leaves no interfering residue.

Therefore, in one aspect the present invention is a method for detecting chlorine breakthrough during production of chlorine dioxide in a chlorine dioxide generator comprising the steps of: withdrawing a sample of chlorine dioxide from a product outlet of the generator; mixing the sample of chlorine dioxide with gaseous ammonia; and introducing the mixture of chlorine dioxide and gaseous ammonia into a test receptacle wherein smoke generated by reaction of chlorine in the chlorine dioxide with ammonia can be observed.

In another aspect the present invention is a method including the step of measuring density of any smoke observed in said test receptacle.

In still another aspect, the present invention is an apparatus for detecting the presence of chlorine in a product stream from a chlorine dioxide generator comprising in combination; a test receptacle having an inlet and an outlet, the test cell fabricated from optically transparent material, means to connect the inlet to a source of the product chlorine dioxide stream and a source of gaseous ammonia or ammonia vapor, and means to detect products of reaction between the ammonia and any chlorine present in the chlorine dioxide product stream.

In yet another aspect the present invention is a process for eliminating chlorine from a gaseous stream containing chlorine dioxide, chlorine and a diluent comprising the steps of; reacting the stream containing chlorine dioxide, chlorine and a diluent with gaseous ammonia to produce a mixture of chlorine dioxide, diluent and ammonia chloride; and separating the chlorine dioxide and diluent from the ammonia chloride.

DETAILED DESCRIPTION OF THE INVENTION

The present invention utilizes the discovery that chlorine gas reacts with ammonia ($NH_3$), while chlorine dioxide gas does not. When chlorine reacts with ammonia in the gas phase it produces a white smoke, believed to contain ammonium chloride particles. If an excess of ammonia is mixed with the gas to be measured, the density of the smoke increases with the concentration of the chlorine in the sample. According to one aspect of the invention smoke generated by the reaction can be detected by optical means, such as light absorbence, light scatter or light transmission. When a beam of light shines through a transparent cell containing a sample of chlorine in chlorine dioxide and air into which ammonia has been introduced, the amount of transmitted light decreases with the amount of chlorine in the sample. In other words, if no chlorine is present there will be no decrease in the amount of light passing through the cell, other than losses that would normally be encounted from the cell itself and/or the solution.

There are other techniques, which may be useful for detecting and measuring the density of the smoke. However, many of the available techniques, although they would work are not preferred because of the corrosive nature of chlorine and/or chlorine dioxide in the sample. For instance, corrosion may pose a serious problem in any system where the gas sample, especially humidified gas, comes in contact with metallic components, or with components made of many types of non-metallic materials.

Figure 1:
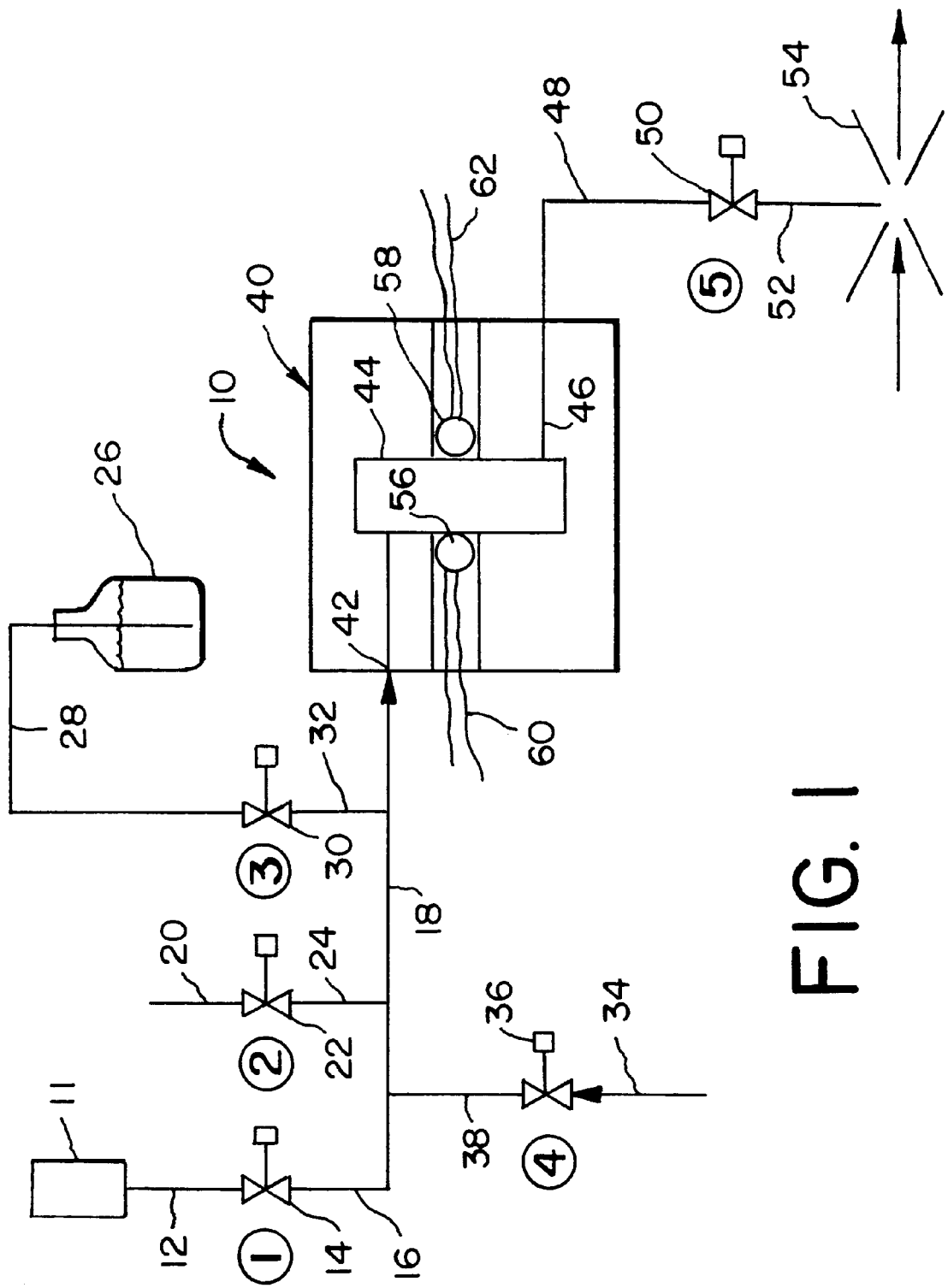
FIG. 1, is a schematic diagram of an analytical process according to the present invention.

Referring to FIG. 1, the process of the present invention is designated generally by the numeral 10. According to the process of the present invention an inlet conduit 12 having a control valve 14 is connected to an outlet conduit of the chlorine dioxide generator 11 so that a sample of the product chlorine dioxide can be introduced into an apparatus according to the present invention.

Valve 14, is in turn connected via conduit 16 to a central manifold conduit 18. A source of water is introduced via conduit 20, control valve 22 and conduit 24 into the manifold 18. A source of ammonia 26 is connected via conduit 28, control valve 30 and conduit 32 to manifold 18. Lastly, a source of air is introduced via conduit 34, valve 36 and conduit 38 into the manifold 18. Manifold 18 in turn is connected to the inlet of a sample block or sample holder 40. Inlet 42 of the sample block 40 permits the various fluids or gases to be introduced into a sample tube 44. Sample cell 44 has an outlet conduit 46, which is connected via conduit 48, control valve 50, and conduit 52 to a vacuum ejector 54. Sample cell 44, sometimes referred to as a test receptacle, test cell, sample tube or sample holder, is made of a transparent material, preferably glass, so that corrosion does not become a problem. The glass sample cell 44 can be mounted vertically as shown in FIG. 1. The glass sample cell 44 has a light source 56 and a light receiver 58, which are connected to test instrumentation via leads 60 and 62 respectively. Leads 60 are connected to a DC (direct current) power supply to power the light source. Leads 62 are connected to a digital volt-ohm-multimeter. Such instruments are well known to workers skilled in the art.

Figure 2:
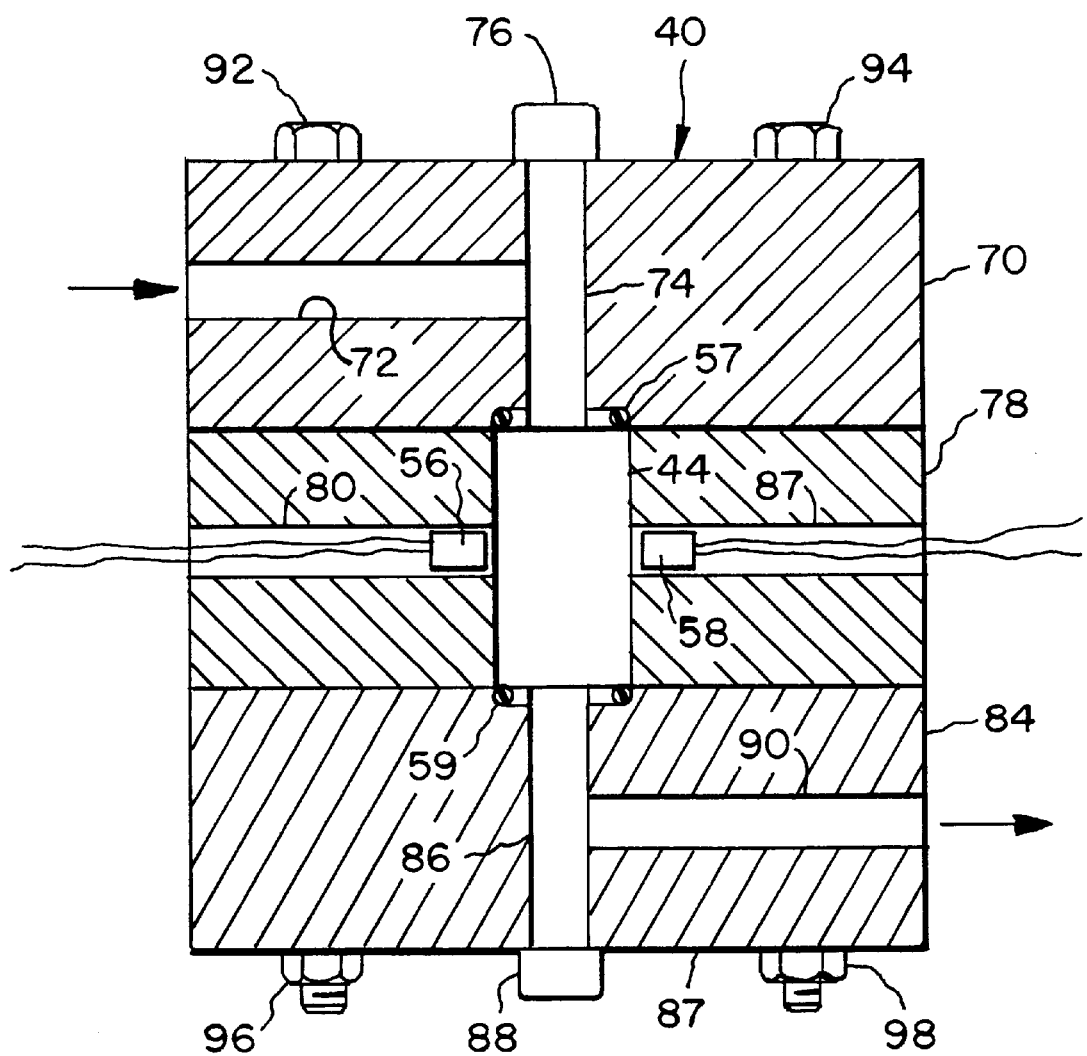
FIG. 2, is a schematic representation of a test cell according to the present invention.

FIG. 2, shows one form of the sample block or apparatus 40, which can be made from three separate blocks of material such as acrylic resins or other structural plastic materials. The first or top block 70 contains an inlet conduit 72, which communicates with a vertical conduit 74. Conduit 74 extends to the top surface of block 70 where it is closed by a cap or other suitable closure device 76. Conduit 74 terminates at an entrance to the test receptacle 44. Test receptacle 44 is contained in the middle block 78. Middle block 78 has suitable conduits 80, 87 to position the light emitter 56 and the light receptacle 58. The bottom of glass of sample tube 44 is closed by the bottom block 84, which has a vertical conduit 86, which extends from the bottom of the sample cell 44 to the bottom surface 87 of block 84. Conduit 86 is closed by a cap or other suitable closure device 88. An outlet conduit 90 extends from the vertical conduit 86 to an outer surface of bottom block 84 so that the sample can be withdrawn. As stated above the sample block 40 can be made from separate pieces of structural plastic materials which can be held together by through bolts 92, 94 and nuts 96, 98. "O" rings 57 and 59 are used to prevent leaking of the sample from the top or bottom of the sample tube 44.

The apparatus shown schematically in FIGS. 1 and 2 has been designed to work in conjunction with a production scale chlorine dioxide generator. In view of the fact that the production scale chlorine dioxide generator used with the present invention operates under a vacuum (typically 15 inches of mercury) the sample and the sample cell 44 must be under slightly higher vacuum to draw the sample from the generator into the cell 44.

Figure 3:
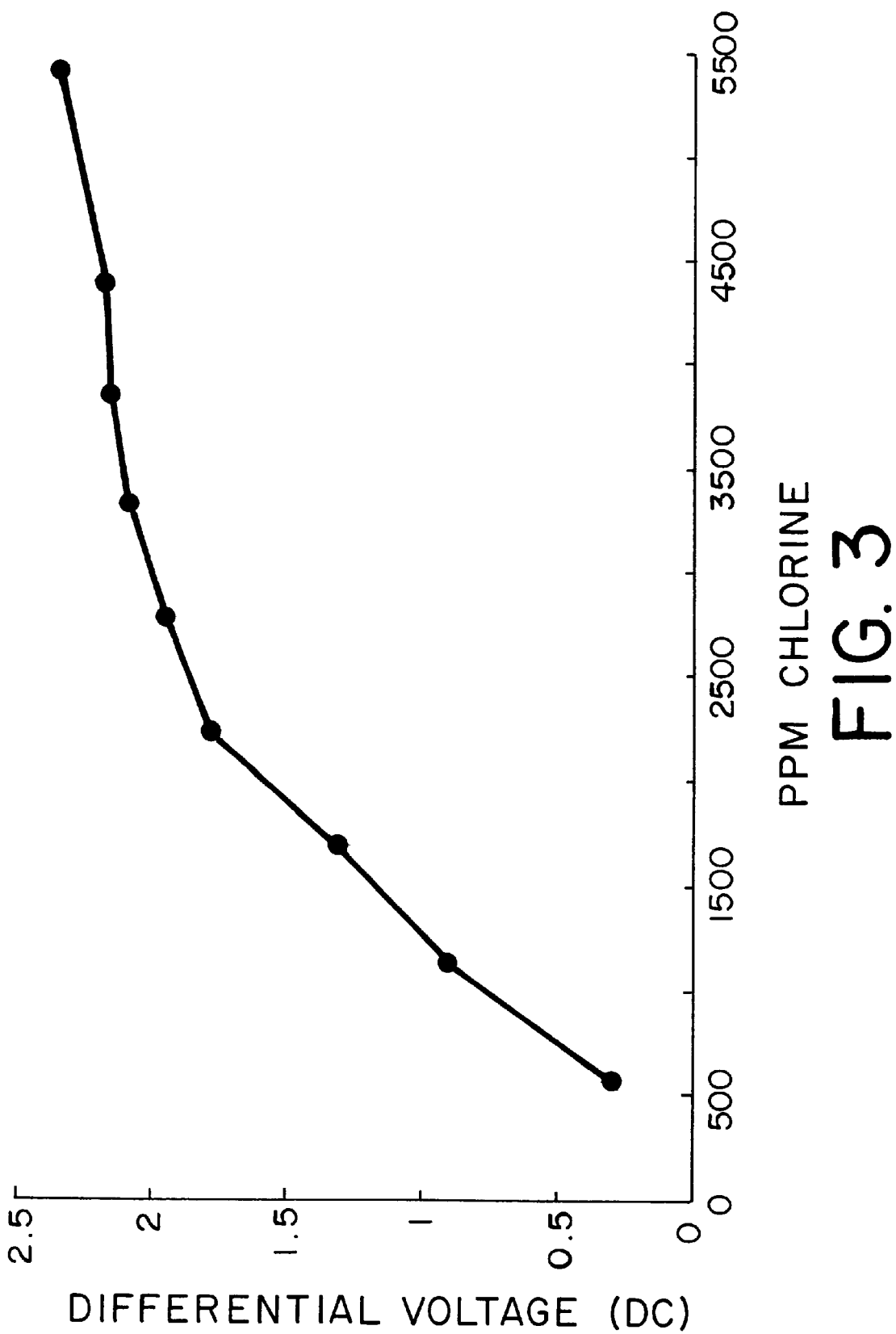
FIG. 3, is a plot of chlorine content against differential direct current voltage.

The analytical process according to the present invention can by cyclical in nature. According to one embodiment of the present invention the entire cycle lasts approximately 2.5 minutes, though it could be considerably longer or shorter. At the beginning of the cycle valves 14 and 50 are opened to draw a sample through the cell. The light emitter 56 shines on the receiver 58 and the output of the receiver is amplified into a signal that is used as the zero signal. Thereafter valve 30 is opened and ammonia begins to flow through the cell containing the sample. The signal from the infrared receiver is measured relative to zero and the difference is interpreted as to the concentration of the chlorine. This is shown in the graph of FIG. 3. Thereafter, valves 14 and 30 are closed and valve 22 is opened. Water flows through the cell and tubing to dissolve any build up of ammonium chloride. Valve 22 is then closed and valve 36 is opened to vent the cell and drain the wash water from the cell. Valves 36 and 50 are then closed and the system is idle until the next cycle is initiated. The exact sequence may be varied. For example, if the idle time were long, it might be desirable to wash the cell 44 immediately prior to introduction of the chlorine dioxide sample in order to wash out any condensation left in the cell. On the other hand if the idle time is short it might be desirable to have the idle time immediately after the wash cycle to give the cell more time to drain before sampling.

According to the present invention the source of ammonia vapor for reaction ammonia used is an aqueous solution of ammonia with the concentration of ammonia between 10 and 30 percent. Tests have shown that there is no difference in effectiveness between reagent grade ammonia solutions and household ammonia solutions. For example, the solution of ammonia can be injected into sample cell and enough volatilizes to cause reaction. For each sample, only between one and two cubic centimeters of ammonia solution or less is necessary. Gaseous anhydrous ammonia could also be used but it is not preferred because of problems associated with handling gaseous anhydrous ammonia.

The light used in detecting the smoke should be of a wavelength that does not cause breakdown of the chlorine dioxide. It is well known that chlorine dioxide is subject to photolysis, e.g., ultraviolet light decomposes chlorine dioxide into chlorine and oxygen. Tests according to the present invention have shown that chlorine produced by photolytic decomposition of chlorine dioxide reacts with ammonia to generate smoke, thereby leading to a false positive signal. Tests have also shown that lower frequency light in the visible range also appears to cause such a breakdown. Samples of pure, dilute chlorine dioxide with gaseous ammonia in a glass flask remain clear yellow in the dark, but turn cloudy within a few seconds in low-intensity ambient fluorescent light. It has also been found that mixtures of pure chlorine dioxide gas and ammonia gas exposed to high intensity incandescent light in a turbidimeter deposit a white coating on the inside of the glass sample tube. The shape of the deposited spot of this white coating is the same as the shape of the light beam. It is not clear in either the case of incandescent or fluorescent light, whether the breakdown of chlorine dioxide is caused by visible light or by high frequency components of light which are otherwise in the visible range. Experiments have shown, light in the red to infrared region of the spectrum (greater than 630 nanometers wavelength) show no breakdown of chlorine dioxide. The device according to a preferred embodiment of the present invention utilizes light in the infrared spectrum.

In view of the fact that clouding of a glass sample cell can occur by deposits of ammonium chloride produced when chlorine is present, a preferred method and apparatus includes the cycle in which the sample cell and all the tubing that might contain ammonium and chlorine are flushed out with clean water and then drained. Since there is a possibility that the sample tube might cloud up over extended periods due to insoluble deposits or chemical reactions in the glass sample cell, the cycle of the present invention has been designed to be self-zeroing. In order to accomplish self-zeroing according to the invention, after each water/flush cycle the infrared light is passed through the sample cell containing air, chlorine dioxide and chlorine (if there is any chlorine to sample), but no ammonia. The signal is then measured from the infrared receiver. This signal intensity is used as the zero level which corresponds to the presence of zero concentration of chlorine. Changes in signal intensity from this zero level are measured to indicate the presence of chlorine when ammonia is added to the cell. It is also possible to zero the analyzer when the cell is only filled with air. However, measurements have shown no difference in light transmission, regardless of whether that cell is filled with air, chlorine, chlorine dioxide or any mixture of these gases as long as there is no ammonia present in the cell. Measurements using red to infrared light (radiation) have also shown no difference in the signal between air in the cell versus a blend of air, chlorine dioxide and ammonia, as long as there is no chlorine present in the cell with this mixture.

As there is a possibility of water condensation inside the sample cell one embodiment may include means for heating the sample cell or otherwise evaporating the condensate between cycles. This can be accomplished by well known techniques.

The process and apparatus of the present invention is intended first for use as a chlorine breakthrough detector in the product gas from a gas-solid chlorine dioxide generator. Therefore, a simple device can be constructed where the emphasis is placed upon reliability, low cost and low maintenance. Typically, devices of this general design would be used to detect the presence or absence of chlorine and can be operated unattended without maintenance for days or weeks.

Figure 4:
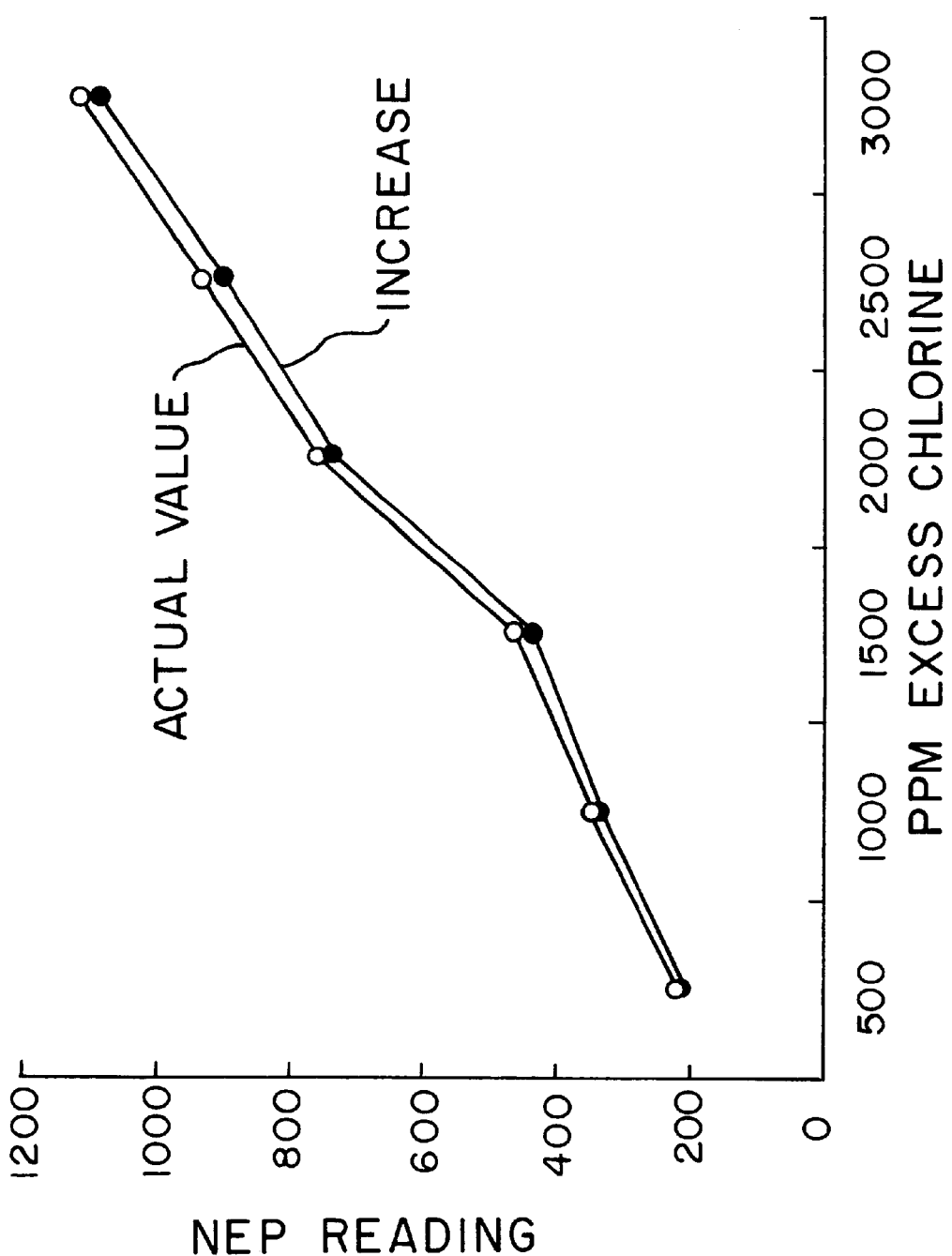
FIG. 4, is a plot of excess chlorine content against any NEP values both for actual values and increased values.

Tests were carried out using a HACH turbidimeter. This instrument measures the side-scatter of light from a high intensity incandescent bulb in units of NEP (Nephelos). It was found necessary to equip the device with infrared filters to prevent fogging of the sample cell. When so equipped, the device was able to quantitatively and repeatedly measure the concentration of smoke and hence indicate the levels of chlorine gas and the chlorine dioxide gas, with chlorine at the 100 to 1000 ppm level. Results of these tests are plotted in FIG. 4.

Figure 5:
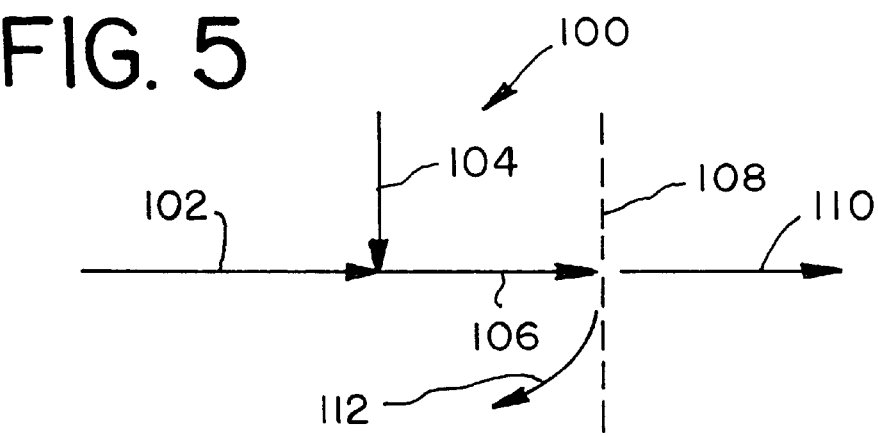
FIG. 5, is a schematic flow diagram illustrating a separation process according to the invention.

According to another part of the invention, the discovery that ammonia reacts with chlorine in the gas phase while it does not react with chlorine dioxide makes it possible to separate chlorine from a gaseous stream containing chlorine dioxide and a diluent such as air. Referring to FIG. 5, the contaminated gas containing chlorine dioxide, chlorine and a diluent is represented by arrow 102. Ammonia gas is introduced into the contaminated stream as shown by arrow 104. Contained in the reaction mixture represented by arrow 106 are gaseous chlorine dioxide, a diluent, and solid particles of ammonium chloride. The mixture of chlorine dioxide, diluent and solid ammonium chloride particles can be passed through a filter, represented by dashed line 108, which traps and removes the solid ammonium chloride particles represented by arrow 112. This leaves a product stream represented by arrow 110 which contains chlorine dioxide and diluent. This process can be extremely important when it becomes necessary to remove even small amounts of chlorine from a chlorine dioxide/diluent gas stream. Any excess ammonia gas present in the product stream 110 can be removed by wellknown techiques.

Having thus described our invention, what is desired to be secured by Letters Patent of the United States is set forth in the appended claims, which should be read without limitation.

What is claimed:

1. A method for determining the volume of chlorine gas breakthrough during production of chlorine dioxide in a chlorine dioxide generator comprising the steps of:

using a detector cell fabricated from a transparent material, said detector cell interposed between a light emitter for emitting light in the red to infrared region of the spectrum and a spectrum matching light detector, said light emitter and light detector connected to means to detect and display a decrease in the level of transmitted light between said cell being empty of smoke and said cell containing smoke produced by reaction of chlorine gas and ammonia present in said cell, withdrawing a sample of chlorine dioxide from a product outlet of said generator;

mixing said sample of chlorine dioxide with gaseous ammonia;

introducing said mixture of chlorine dioxide and gaseous ammonia into said cell for a period of time sufficient for smoke to be generated by reaction of chlorine in said chlorine dioxide with ammonia;

observing said means to detect and display said transmitted infrared light; and comparing the difference between the level of transmitted infrared light prior to introducing said sample into said cell and after smoke appears in said cell to determine the volume of chlorine gas breakthrough.

2. A method according to claim 1, including the step of using optical radiation having a wavelength greater than 630 nanometers.

3. A method according to claim 1, including the step of removing said mixture of chlorine dioxide, ammonia and any reaction products from said test receptacle after a period of time ranging from 5 seconds to 10 minutes.

4. A method according to claim 1, including the step of holding said mixture of chlorine dioxide and ammonia in said test receptacle for a period of time sufficient to permit reaction of ammonia with any chlorine present in said chlorine dioxide product and thereafter washing said test cell with clean water.

5. A method according to claim 1, including the step of withdrawing a sample of product chlorine dioxide from said chlorine dioxide generator from 1 to 20 times per hour of operating said chlorine dioxide generator.

6. A method according to claim 1, including the step of adjusting process parameters in said chlorine dioxide generator when smoke is observed in said test receptacle in order to suppress chlorine presence in said product stream.

7. A process for eliminating chlorine from a gaseous stream containing chlorine dioxide, chlorine and a diluent comprising the steps of:

reacting said stream containing chlorine dioxide, chlorine and a diluent with gaseous ammonia to produce a mixture of chlorine dioxide, diluent and ammonium chloride; and separating a chlorine dioxide and diluent stream from said ammonium chloride.

8. A process according to claim 7, including the step of removing excess gaseous ammonia from said chlorine dioxide and diluent stream.

* * * * *

UNITED STATES PATENT AND TRADEMARK OFFICE
CERTIFICATE OF CORRECTION

PATENT NO. : 6,537,821 B1
DATED : March 25, 2003
INVENTOR(S) : Aaron A. Rosenblatt et al.

It is certified that error appears in the above-identified patent and that said Letters Patent is hereby corrected as shown below:

<u>Title page,</u>
Item [56], U.S. PATENT DOCUMENTS, please insert the following:
--      4,504,442     03/1985     Rosenblatt et al.;
         4,681,739     07/1987     Rosenblatt et al.;
         4,908,188     03/1990     Jefferis, III et al.;
         5,110,580     05/1992     Rosenblatt et al.;
         5,234,678     08/1993     Rosenblatt et al.;
         5,290,524     03/1994     Rosenblatt et al.;
         5,326,546     07/1994     Rosenblatt et al.; --

Signed and Sealed this

Twelfth Day of August, 2003

JAMES E. ROGAN
*Director of the United States Patent and Trademark Office*